United States Patent [19]

Dowling et al.

[11] 4,102,185
[45] Jul. 25, 1978

[54] ACOUSTIC-NUCLEAR PERMEABILITY LOGGING SYSTEM

[75] Inventors: Donald J. Dowling; Dan M. Arnold, both of Houston, Tex.

[73] Assignee: Texaco Inc., New York, N.Y.

[21] Appl. No.: 748,978

[22] Filed: Dec. 9, 1976

[51] Int. Cl.$^2$ .............................................. E21B 47/10
[52] U.S. Cl. ..................................................... 73/155
[58] Field of Search ......................... 73/155, 152, 151

[56] References Cited

U.S. PATENT DOCUMENTS

| | | | |
|---|---|---|---|
| 3,320,803 | 5/1967 | Lord | 73/152 |
| 3,508,439 | 4/1970 | Alger | 73/152 |
| 3,990,297 | 11/1976 | Pelet et al. | 73/152 |

*Primary Examiner*—Jerry W. Myracle
*Attorney, Agent, or Firm*—Carl G. Ries; Thomas H. Whaley; William J. Beard

[57] ABSTRACT

Disclosed is a down hole logging tool featuring a neutron generator, an acoustic disturbance generator, and a radiation detection system. In the embodiment shown, an array of acoustic magnetostriction transducers is arranged about the target of a neutron accelerator. Two gamma ray sensors are separated from the accelerator target by shielding. According to the method of the invention, the underground fluid at the level of a formation is bombarded by neutrons which react with oxygen in the fluid to produce unstable nitrogen 16 particles according to the reaction $O^{16}(n,p)N^{16}$. Acoustic pulses are communicated to the fluid, and are incident on the boundary of the borehole at the formation. The resulting net flow of fluid across the boundary is determined from radiation detection measurements of the decaying $N^{16}$ particles in the fluid. A measure of the permeability of the formation is obtained from the determination of net fluid flow across the boundary.

35 Claims, 8 Drawing Figures

ACOUSTIC-NUCLEAR PERMEABILITY LOGGING SYSTEM

BACKGROUND OF THE INVENTION

1. Field of the Invention

The present invention relates to systems and methods for logging wells to obtain information concerning the characteristics of underground formations. More particularly, the present invention pertains to nuclear and acoustic well logging sondes, and to logging techniques of measuring the permeability of underground formations.

2. Description of Prior Art

It is well known in the field of production of hydrocarbon fluids from underground deposits that the mobility of such fluids, and, hence, the ease with which they may be obtained, depends in part on the physical structures of the formations in which the fluids are found. Furthermore, the existance of such hydrocarbons in underground formations is itself linked to such formation structure. The fluid in a formation exists within the interstitial spaces of the formation, and the mobility of the fluid through the formation to a production borehole is directly affected by the degree of interconnection of such interstitial spaces as well as the size of such spaces. The ability of a formation to communicate fluid is the formation's permeability, and may be measured by the rate of flow of a fluid in the formation. Thus, fluids are relatively free to move in a formation of high permeability, and have little mobility in a formation of low permeability. Consequently, a measure of the permeability of a particular formation may yield valuable information for determining the extent of the presence of fluids, and the ease with which they may be recovered.

In U.S. Pat. No. 3,890,502 to Dowling et al, a nuclear logging tool is disclosed whereby the permeability of a formation is measured through the mechanism of detecting the flow therein of radioactive chloride ions. The method relies upon the existence of salt water in the formation. An electric field is used to attract chloride ions into the borehole, causing a migration of such particles from the formation. The area is then bombarded with neutrons, and a measure of thermal neutron decay is obtained. The chloride ions are then dispersed back to the formation by a magnetostriction transducer, and a second neutron decay measurement obtained. Since the chloride ions possess large neutron capture cross-sections, the neutron decay data may be expected to reveal the extent of migration of the chloride ions to and from the formation, thus yielding a measure of the formation permeability.

Since the permeability of a formation is directly related to fluid movement, the accuracy of permeability measurements may be enhanced by basing them on measurements of fluid velocity, or volume flow, as fluid is made to move through the formation. A down hole tool, such as a logging sonde, is generally confined by the boundaries of the borehole, and direct measurements by probes into a formation are prohibitive. However, a determination of fluid flow within the borehole may be obtained from a measure of net flow of fluid across the boundary, or interface, between the borehole and the formation itself. Thus, as fluid moves into the formation, a component of fluid flow toward the formation level is established in the borehole. By measuring this component of borehole fluid flow, a determination of the permeability in question may be had.

U.S. Pat. Application Ser. No. 628,174, filed Nov. 3, 1975, now U.S. Pat. No. 4,032,780 discloses a logging sonde designed to measure vertical water flow behind casing lining a borehole. A neutron accelerator is used to irradiate the flowing water with neutrons of sufficient energy to transform oxygen in the water into unstable nitrogen 16 particles. A pair of spaced gamma ray detectors then monitor the radioactive decay of the $N^{16}$ particles flowing with the water current. Linear velocity as well as volume flow rate values for the water current may be obtained by appropriately combining the measured radiation detection data.

SUMMARY OF THE INVENTION

Apparatus of the present invention include a down hole tool, or sonde, equipped with a neutron source capable of producing neutrons of 10 MEV or more, a radiation detection system for detecting radiation resulting from the interaction of neutrons from the neutron source with target particles in the vicinity of the tool, and means for producing acoustic disturbances in the underground fluid in the vicinity of the tool. The neutron source may be a neutron generator, or accelerator, of the deuterium-tritium reaction type which produces neutrons of approximately 14 MEV energy, as described in more detail hereinafter. The acoustic disturbances may be selectively generated, either as single pulses or wave trains, by an array of magnetostriction transducers. The radiation detection system may employ any appropriate gamma ray sensors. A pair of such sensors are deployed along the length of the sonde, with each sensor at a different, measured distance from the neutron source. Appropriate shielding is interposed between the sensors and the neutron source to prevent direct bombardment of the sensors. The sonde is suspended from the ground surface by an appropriate line or cable, and connected to surface control and data reduction equipment by appropriate electrical connectors, which may be included as part of the supporting cable.

In the method of the invention, the underground fluid at the location of a borehole in an underground formation is irradiated with neutrons of at least 10 MEV energy. The neutrons are then of sufficient energy to interact with the oxygen in the fluid according to the reaction $O^{16}(n,p)N^{16}$, yielding unstable nitrogen 16 particles. Acoustic disturbances are generated in the borehole fluid, and communicate to the boundary, or interface, between the borehole and the formation itself. Radiation emitted by the $N^{16}$ particles is detected to obtain a measure of the net fluid flow across the interface, and this measure of net fluid flow is reduced to obtain a measure of the permeability of the formation.

The $N^{16}$ particles decay by gamma emission, with a half-life of approximately 7.3 seconds. Very quickly after the neutrons are introduced into the fluid by the generator, a distribution of particles emitting gamma rays is established, and extends across the borehole and into the formation.

The acoustic pulses, or waves, both reflect from, and refract across the borehole boundary. During this process, fluid particles, including decaying $N^{16}$ particles, generally pass back and forth across the interface. However, the fluid experiences different environments on the two sides of the interface, that is, in the two different media. Adhesive forces not found in the borehole act on the fluid particles in the formation interstices. Also, a change in fluid pressure across the interface may act to affect the fluid flow. Consequently, the interaction of the fluid with the solid structure of the formation can be expected to affect the ability of the fluid particles to move back and forth across the borehole boundary. Furthermore, the mechanism that captures fluid particles on the formation side of the boundary also affects the mobility of the fluid in the formation and, therefore, the formation permeability. Thus, narrow interstices hold fluid particles propelled into the formation from the borehole by a compressional pulse and also limit the ability of fluid particles to flow within the formation.

The phenomenon of fluid particles, propelled in one direction or the other across a media boundary by an acoustic disturbance, being trapped across the boundary is an example of acoustic pumping. The result is a net flow of fluid across the boundary triggered by a compressional pulse, or wave train. It will be appreciated that a rarefaction in the acoustic disturbance in the present case may also act to release fluid particles from the formation into the borehole. In general, the totality of factors influencing the fluid particles at the boundary may be complex, and may yield a net fluid flow in either direction across the borehole boundary. In any event, acoustic pumping, and, therefore, net fluid flow across the borehole boundary, are dependent on factors which determine the permeability of the formation. Hence, the fluid flow across the borehole boundary may be used to obtain a measure of the formation permeability.

The generally vertical fluid flow along the borehole that results when fluid is acoustically pumped across the borehole boundary at the formation may be measured to obtain information concerning the net fluid flow across the boundary. Radiation counts of the gamma rays emitted by the $N^{16}$ particles moving as part of the fluid flow are taken at two positions along the borehole as discussed in more detail hereinafter. Such count data is then reduced to acquire a value of the linear velocity of the fluid flow, and may also provide a value of the volume fluid flow rate as well. In another embodiment, the detection system is positioned at the formation to measure radiation directly from fluid within the formation after acoustic pumping has ceased. In the case of any of the method embodiments disclosed, a standard permeability measure may be obtained by carrying out the steps of the method to obtain a permeability evaluation of a formation of "known" permeability. Where the standard permeability measure is actually known, the apparatus is thus calibrated, and the data reduction process standardized to yield absolute permeability values of other formations. Otherwise, relative permeability values may be obtained for other formations, based on the standard, or "known," formation permeability measure.

The apparatus and method of the present invention thus provide an evaluation of underground formation permeability utilizing acoustic pumping and radiation detection to determine the extent of the acoustic pumping, as affected by formation permeability. The $O^{16}(n,p)N^{16}$ reaction is employed to take advantage of the oxygen present in the underground fluid and provide a distribution of unstable $N^{16}$ particles to use in detecting net fluid flow.

DESCRIPTION OF PREFERRED EMBODIMENTS

Figure 1:
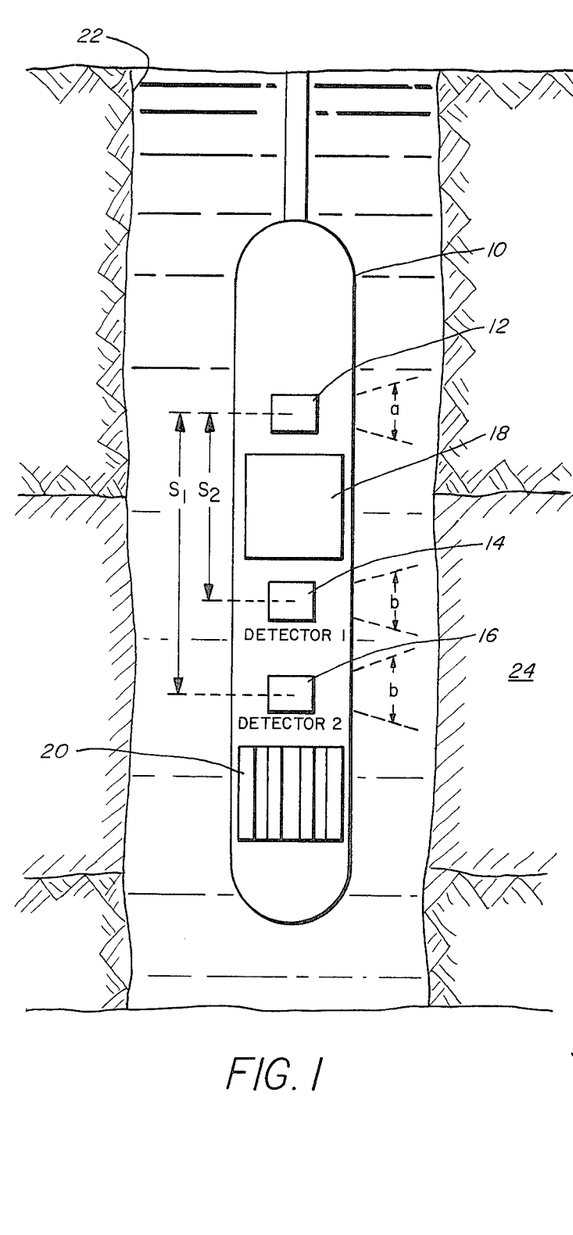
FIG. 1 is a schematic representation showing the essential features of a logging tool, acourding to the present invention, located in a well borehole.

The present invention utilizes induced motion of underground fluid, particularly water, and radioactive decay of the unstable isotope nitrogen 16 to measure the degree of permeability of underground formations. FIG. 1 shows a logging sonde 10 equipped with a fast neutron source 12 and two detectors 14 and 16. A distance $S_1$ separates the center of the neutron source 12 from the center of the first detector, 14; a distance $S_2$ separates the center of the neutron source from the center of the second detector, 16. An expanse of shielding 18 lies between the neutron source 12 and the two detectors 14 and 16. An array of magnetostriction transducers 20 surrounds the neutron source 12 in a plane transverse to the longitudinal axis of the sonde 10.

The sonde 10 is shown positioned within a borehole 22 of a well, at the level of a formation 24. The borehole 22 and the formation 24 contain fluid, including water. The extent of the fluid presence in the formation 24 depends on the solid structure of the formation. An acoustic disturbance generated in the fluid in the borehole 22 will be partly refracted into the formation, depending on the boundary conditions at the interface between the borehole and the formation 24 itself, as discussed hereinbefore. Such a disturbance may be selectively induced by operation of the array of transducers 20. The transducers 20 are arranged so that they generate a pulse, or wave train, which propagates radially outwardly, generally along a horizontal plane at the level of the transducers, over a full 360 degree arc. As the acoustic disturbance moves away from the transducers 20, the disturbance grows vertically as well. However, in a narrow borehole 22, the pulse rapidly reaches the borehole boundary.

The fluid motion at the levels of the detectors 14 and 16 is measured using the mechanism of detecting radioactive decay of the unstable isotope nitrogen 16. The fast neutron source 12 produces neutrons capable of reacting with the oxygen 16 particles in the underground water to produce the isotope nitrogen 16, the reaction being $O^{16}(n,p)N^{16}$. Thus, a pulse of neutrons from the neutron source 12 causes the formation of $N^{16}$ particles generally throughout a spherical region centered on the neutron source. Only the area directly below the shielding 18 is protected from the neutron induced reaction. However, unstable $N^{16}$ particles are produced beyond the positions of the detectors 14 and 16. With the decaying $N^{16}$ particles then interspersed generally throughout the fluid, the transducers are activated to generate a radial pulse, or wave train, which then moves toward the lateral boundary of the borehole 22. Interaction of the acoustic disturbance with the borehole boundary occurs with acoustic pumping across the boundary, resulting in net fluid flow along the borehole 22. The detectors 14 and 16 are used to count $N^{16}$ particle decay events as the borehole fluid flow occurs, thereby obtaining a measure of the acoustic pumping effect between the borehole 22 and the formation 24.

Figure 2:
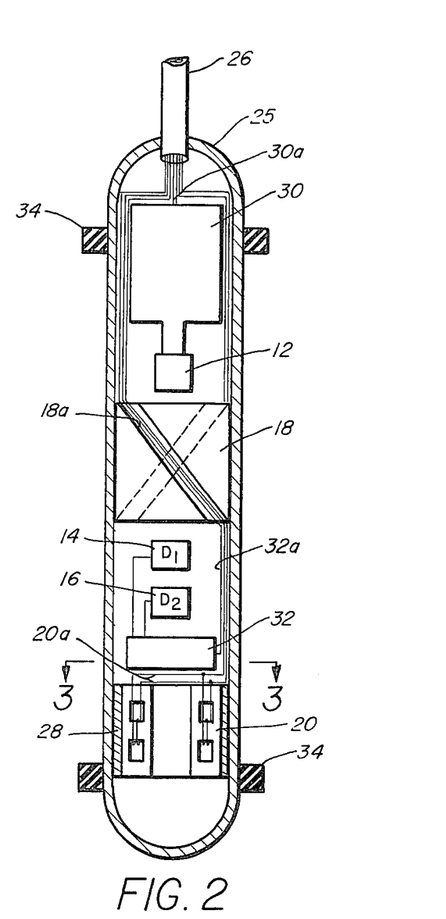
FIG. 2 is a schematic elevation, partly in section, of an acoustic-nuclear logging sonde showing some details of the essential elements.
Figure 3:
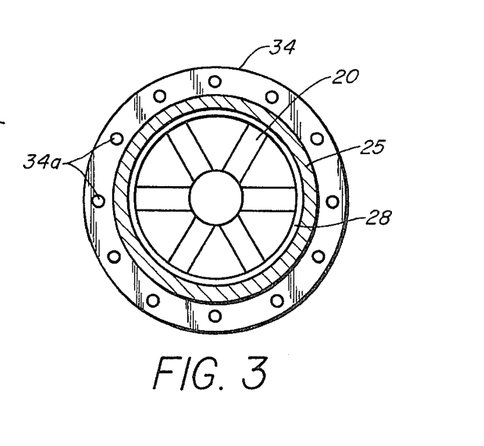
FIG. 3 is a cross-sectional view taken along the line 3—3 of FIG. 2, and schematically showing the transducer array.

FIGS. 2 and 3 show the sonde 10 of FIG. 1 in more detail. The sonde 10 is enclosed within a fluid-tight, elongate housing 25, and is suspended by an armoured cable 26 which leads to the well surface. The cable 26 not only supports the sonde 10, but also encompasses a protective shield for electrical conductors leading from appropriate instrumentation at the surface to the various components within the sonde 10. Only a pair of magnetostriction transducers 20 are shown in FIG. 2. However, as may be noted in FIG. 3, a greater number of such transducers 20 are employed to generate the desired radial pulse or wave train. Six such transducers 20 are shown arrayed symetrically about the axis of the sonde 10. Only schematic representations of the transducers 20 are given in FIGS. 2 and 3. In general, each such transducer 20 may include one or more cores, with appropriate windings. Each transducer 20 is oriented with an emitting face directed along a radial line as shown. A surge of current in the windings generates a pulse along the radial line. A coupling ring 28 encircles the transducers 20, and forms an acoustic coupling between each transducer and the housing 25. The purpose of the acoustic coupling ring 28 is to provide a generally impedence-matched path between the transducers 20 and the housing 25. In this way, the communication of acoustic disturbances generated by the transducers 20 through the housing 25 to the surrounding fluid is maximized. The housing 25, or at least a portion thereof surrounding the transducers 20, constitutes the final solid surface propagating the acoustic disturbances into the fluid. It will be appreciated that the transducer arrangement 20 is shown schematically herein, and that more or less transducers may be included as part of the logging tool 10. The design of such transducers 20 may also vary without deviating from the present invention.

The measurements of fluid behavior by the detectors 14 and 16 rely on the activation of the oxygen 16 nuclei by the capture of neutrons with energy equal to or greater than 10 MEV. This necessitates the use of a neutron generator which can generate a sufficient intensity of neutrons having an energy of 10 MEV or greater. An accelerator type neutron source, employing the deuterium-tritium reaction to generate neutrons, provides such a flux of high energy neutrons at sufficient intensity to carry out the measurements. The neutron source 12 may be an element of such a neutron accelerator, indicated as 30 along with its accompanying power supply circuitry. The neutron source 12 is then a target impregnated with a high percentage of tritium, and maintained at a large negative potential relative to a source of deuterium nuclei (not shown) within the accelerator 30. To function, the accelerator 30 generates a concentration of deuterium ions from the deuterium source, which ions are then accelerated by the large negative potential toward the target 12. A thermo-nuclear fusion reaction takes place between the deuterium and the tritium nuclei, generating a relatively high intensity of neutrons having an energy of approximately 14 MEV. Thus, by selective operation of the accelerator 30, pulses of 14 MEV neutrons may be produced at the neutron source 12.

The shielding 18 may be of any suitable type and extent to effectively prevent the detectors 14 and 16, shown in FIG. 2 as D1 and D2 respectively, from experiencing too high a background level due to the intense radiation in the vicinity of the neutron source 12 as well as direct bombardment by neutrons generated by the source 12. Appropriate cables 30a and 20a extend from the accelerator 30 and transducers 20, respectively, to enter the cable 26.

The detectors 14 and 16 are each joined to appropriate down-hole electronic circuitry 32, including, but not necessarily limited to, pertinent power supplies, amplifiers and switching mechanisms. The electronic circuit package 32 is connected to appropriate circuitry at the surface (not shown) by cables 32a, which are also joined to the armoured cable 26.

To bypass the shielding without providing a radiation leak therethrough, the cables 32a may be placed in helical grooves 18a provided in the shielding. Such a shielding element is described in U.S. Pat. No. 3,969,630 which is assigned to the assignee of the present invention.

The sonde 10 is equipped with positioning members 34 which ride along the wall of the borehole 22 as the sonde is lowered down the well to position the sonde laterally within the borehole as desired. These positioning devices 34 may take on a variety of forms, and are shown in FIG. 2 in the representative form of rings of resilient material. As may be seen in FIG. 3, each ring 34 is equipped with a plurality of through-bores 34a to permit the flow of fluid in the borehole relative to the sonde 10 as the sonde is being moved vertically within the well, and as the fluid is made to flow by acoustic pumping. The positioning devices 34 may also take the form of bow springs (not shown) which ride along the wall of the borehole. Thus, the positioning devices 34 may be designed to center the sonde 10 laterally within the borehole 22, as are the devices 34 shown herein, or they may be designed to offset the sonde relative to the central axis of the borehole. In the latter case, for example, a single bow spring on one side of the sonde 10 may ride along the borehole wall, and maintain the opposite side of the sonde pressed against the wall.

The gamma ray detectors 14 and 16 may be of any appropriate type, such as scintillation counters, well known in the art. It will be appreciated that the nature of the associated electronic circuit package 32 will be dictated in part by the choice of detectors 14 and 16.

It will be appreciated that the actual construction of the sonde 10 may be varied. For example, the housing 25 may be constructed in sections which are subsequently joined together as the sonde is assembled. Thus, one section of the housing 25 might be devoted to containing the accelerator 30, and the neutron source 12. An additional section might house the shielding 18. One or more sections might be devoted to containing transducers 20 and the detectors 14 and 16 and their associated circuitry unit 32. Also, the sonde 10 may be arranged so that the transducers 20 are placed above the neutron source 12 which is, in turn, positioned above the detectors 14 and 16. Such an arrangement might be particularly advantageous where a well is being continuously logged by raising the sonde 10 in the borehole, with a succession of formations being tested for permeability value.

Measurements obtained by the detectors 14 and 16, in conjunction with their accompanying electronic circuitry systems 32, are in the form of electronic pulses, with each pulse corresponding to a detected gamma emission event. Thus, the detectors 14 and 16 count the gamma ray decay events experienced by the unstable $N^{16}$ particles in the fluid. A discussion, in some detail, of the reduction of such count data to fluid flow information is given in the aforementioned U.S. Pat. Application Ser. No. 628,174 filed Nov. 3, 1975.

Consider a burst of neutrons from the neutron source 12, reacting with the oxygen in the fluid to produce gamma-emitting $N^{16}$ particles as discussed hereinbefore. With the transducers 20 acoustically pumping fluid across the borehole boundary, the fluid in the borehole 22, including irradiating $N^{16}$ particles, flows by the detectors 14 and 16. It can be shown that $C_1$, the counting rate of the first detector 14, resulting from the induced radioactive $N^{16}$ activity is given by equation (1).

$$C_1 = LK(R)V(e^{\lambda a/2v} - e^{-\lambda a/2v})(e^{\lambda b/2v} - e^{-\lambda b/2v})e^{-\lambda S_1/v} \tag{1}$$

where
L = (a constant) = $N_o \rho \sigma \phi a G / M \lambda b$ where $N_o$ is Avogadro's number, $\rho$ is the density of the fluid, $\sigma$ is the cross-section for neutron capture by oxygen 16, $\phi$ is the neutron output rate of the source 12, G is a constant depending on the efficiency and geometry of the detector 14, M is the molecular weight of the fluid, $\lambda$ is 0.0936 sec$^{-1}$, the decay constant of $N^{16}$, and $b$ the effective detection length of the fluid as it passes the detector 14 (see FIG. 1);
K(R) = a function dependent upon the distance R from the center of the sonde 10 to the center of the fluid flow along the sonde-borehole 22 annulus;
V = volume fluid flow rate;
$a$ = the effective radiation length of the fluid along the borehole 22 (see FIG. 1);
$v$ = the linear velocity of the fluid along the borehole 22; and
$S_1$ = the source-detector spacing for the first detector 14, as identified hereinbefore.

Similarly, for the second detector 16, a distance $S_2$ from the neutron source 12, the count rate $C_2$ is given by equation (2).

$$C_2 = LK(R)V(e^{\lambda a/2v} - e^{-\lambda a/2v})(e^{\lambda b/2v} - e^{-\lambda b/2v})e^{-\lambda S_2/v} \tag{2}$$

In FIG. 1, the distances $a$ and $b$ are indicated in a schematic sense only. As discussed hereinbefore, the region exposed to neutrons from the source 12 generally extends in both directions along the borehole 22. In any event, the value $a$ is the same for both detectors 14 and 16. The distances $b$ for both detectors might vary if the borehole 22 is of different diameter at the levels of the two detectors 14 and 16. However, such a situation may be avoided, and the value $b$ made the same for both detectors 14 and 16, by adequately stopping down the detector windows, using shielding stops (not shown), to confine each region measured by $b$ to a flat, wafer-shaped area. Then, the distance $b$ is made constant across the borehole 22 for each detector 14 and 16. Similarly, the quantity G may be made essentially the same for both detectors 14 and 16.

If the geometry of the sonde 10 and the neutron output rate are maintained constant, equations (1) and (2) indicate that for a given value of R, the ratios of the counting rates to the volume fluid flow rate for the respective detectors 14 and 16 are each functions of $v$, the linear fluid flow velocity, and not functions of the geometry of the fluid flow. By combining equations (1) and (2), the ratio of the counting rates may be expressed by equation (3).

$$C_1/C_2 = e^{\lambda(S_2 - S_1)/v} \tag{3}$$

Solving equation (3) for $v$ yields equation (4).

$$v = \lambda(S_2 - S_1)/ln(C_1/C_2) \tag{4}$$

Equation (4) is an expression for the linear fluid flow velocity along the borehole 22 in terms only of known or measureable quantities.

While a measure of formation permeability may be obtained from linear velocity flow values, more accurate permeability determinations may be made from volume fluid flow rate values. By assuming that the intensity of the neutron flux irradiating a volume increment of the fluid, as well as the ability of the induced gamma emission events from said volume increment to be detected by each detector 14 and 16, vary as $1/R^2$, K(R) may be written as:

$$K(R) = P/R^4 \tag{5}$$

where P is a calibration constant. Equations (1) and (2) may be combined with equation (5) as follows:

$$V = \frac{C_1 R^4 e^{\lambda S_1/v}}{LP(e^{\lambda a/2v} - e^{-\lambda a/2v})(e^{\lambda b/2v} - e^{-\lambda b/2v})} \tag{6}$$

$$V = \frac{C_2 R^4 e^{\lambda S_2/v}}{LP(e^{\lambda a/2v} - e^{-\lambda a/2v})(e^{\lambda b/2v} - e^{-\lambda b/2v})} \tag{7}$$

Equations (6) and (7) state that, if $v$ is obtained from equation (4), based on the two detector count rates $C_1$ and $C_2$, and R is determined, the volume fluid flow rate V may be obtained from the count rate of either detector 14 or 16, using either equation (6) or equation (7).

The aforementioned Patent Application Ser. No. 628,174 filed Nov. 3, 1975 also describes techniques for determining R. One such technique is a gamma ray spectral degradation technique, in which the detection system is calibrated for flow detection in terms of the spectral degradation of the radiation events detected as a function of R. In the present case, since the fluid flow from which actual detector counts are obtained in along the vertical borehole 22, it may be expected that the center of the fluid flow will be near the lateral center of the sonde-borehole annulus.

Figures 4, 5:
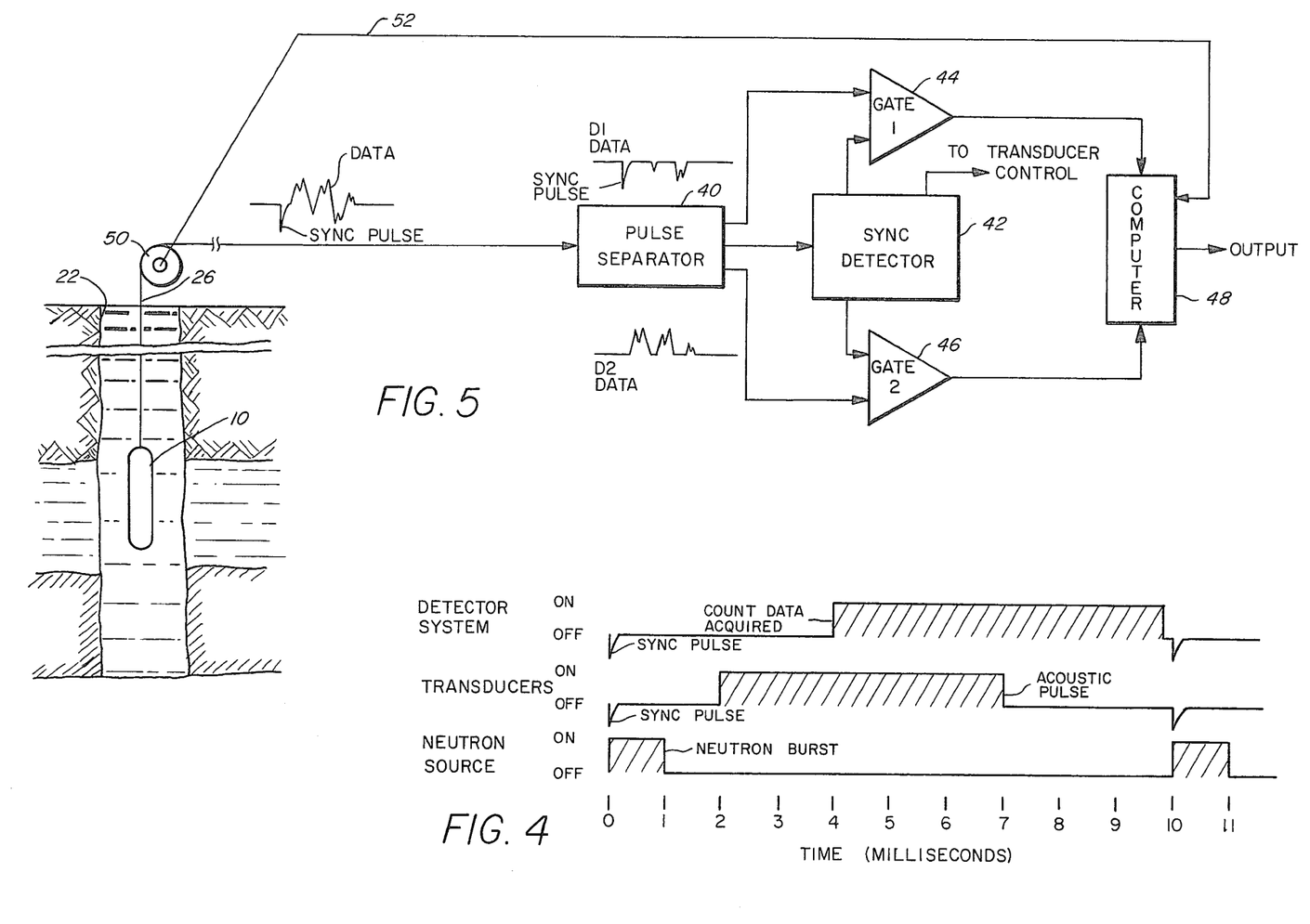
FIG. 4 is a timing chart illustrating a typical cycle for operation of the acoustic-nuclear logging tool of the present invention.
FIG. 5 is a schematic representation showing basic electronic elements for reducing the electronic pulse data from the gamma ray detectors.

To obtain the radiation count data necessary to arrive at a measure of formation permeability, the neutron source 12, transducers 20, and detectors 14 and 16 may be operated in cycles. FIG. 4 illustrates a typical timing pattern which may be followed for such cyclic operations, although the present invention is not limited by such a pattern. Operation of the neutron accelerator 30 to produce a neutron burst from the neutron source 12 beings the cycle. The neutron burst extends for one millisecond. At the time the neutron burst begins, a synchronization pulse is received by the electronics controlling the transducers 20 and the detectors 14 and 16. From reception of the sync pulse, acquisition and recordation of count data obtained by the detectors 14 and 16 is delayed for a time of 4 milliseconds. After the 4 milliseconds, the detectors 14 and 16 continue to acquire radioactive decay data which is received and recorded at the surface for a time of 5.85 milliseconds. The stream of counts from the detectors 14 and 16 is cut off just prior to the start of the next cycle, as signalled by the sync pulse occurring with the next burst. Thus, a time lag of 3 milliseconds occurs at the end of each neutron burst before data taking and evaluation continue. During this time lag, large gamma radiation background is present due to relatively immediate neutron interactions which occur within about a millisecond of the end of the neutron burst. Such gamma radiation is mainly the result of thermal neutron capture interactions with the sonde 10, the formation 24, and, if present, well casing. Consequently, such out-of-phase pulsing of the neutron generator 30 and the detection system eliminates the effect of a large amount of background radiation.

The transducers 20 are also timed to generate an acoustic pulse 1 millisecond after the neutron burst. Thus, motion of the fluid and, therefore, the unstable $N^{16}$ particles is induced after the bulk of the background radiation has subsided. The transducers are indicated as "on" for 5 milliseconds out of the period of 10 milliseconds. Thus, to produce an acoustic pulse as indicated, current is allowed to build up in the coils of the transducers 20 for, say, 3 milliseconds, leaving 2 milliseconds for the current to die down, and the transducers to relax. Rather than an individual pulse being generated for each neutron burst, a continuous wave pattern may be established and maintained for approximately 5 milliseconds for each neutron burst. The wave pattern will be damped by interaction of the fluid particles and the effects of the formation and sonde during the 5 millisecond interval that the transducers are "off." Consequently, the fluid returns to an essentially "still" condition before each neutron burst occurs. As an alternative to the cyclic operation of the transducers 20 as indicated by the timing chart of FIG. 4, the transducers may be operated continuously to sustain a wave train while the neutron generator 30 and the detector system are each either pulsed or operated continuously as well.

FIG. 5 illustrates the essential features of electronic circuitry which may be located at the surface for the purpose of converting the electronic signals ultimately produced by the detectors 14 and 16 into output data in the form of fluid flow and/or permeability values. Gamma ray detection data from the detectors 14 and 16 is transmitted along the cable 26 in the form of electronic pulses. The pulses from the first detector 14, D1, may take the form of negative polarity voltage pulses, while pulses generated by the second detector 16, D2, in response to gamma radiation may be positive polarity voltage pulses. The synchronization pulse may be a negative pulse whose magnitude is larger than any data pulse expected. A pulse separator 40 identifies the pulses from the two detectors on the basis of electrical polarity. The negative pulses, including the sync pulse, are transmitted to a synchronization pulse detector 42 which is used to control the timing of the transducer and detector "on-off" sequences. Thus, a separate outlet from the sync detector 42 leads back to the power supply (not shown) for the transducers 20. Thus, an appropriate timing pulse leaves the sync detector 42 and triggers the transducer circuitry 2 milliseconds after the identification of the sync pulse. Similarly, output signals from the sync detector proceed to gates 1 and 2, 44 and 46 respectively. These gates 44 and 46 also receive continuous signals from the detectors 14 and 16. Thus, the negative pulses generated at the D1 detector are transmitted to gate 1, 44, while the positive pulses of the D2 detector are passed to the gate 2, 46. Only when these gates 44 and 46 are enabled by reception of appropriate signals from the sync detector 42 will output signals proceed from the gates. Thus, the gates are enabled during the 5.85 millisecond portion of each cycle during which the detector system is "on." During the remainder of each cycle, the gates 44 and 46 do not receive signals from the sync detector 42, and, therefore, no signal is transmitted by either of the gates, and the detector system if "off."

Output signals from the gates 44 and 46 are fed to a computer 48, wherein the calculations indicated hereinbefore to reduce the count data to linear velocity and/or volume flow rate values are carried out. A sheave 50 is schematically indicated as providing rolling support for the cable 26 by which the sonde 10 may be raised or lowered within the borehole 22. Then, an appropriate probe and input connector 52 from the sheave 50 may be used to provide information to the computer 48 concerning the position of the sonde 10 in the borehole 22. With such as arrangement, the sonde 10 may be raised or lowered throughout the length of the borehole 22, or a portion thereof, and continuous data obtained concerning the permeability of the various underground formations. The output from the computer 48, then, may include permeability information for the various formations found throughout the length of the borehole 22.

The computer 48 may also be used to carry out additional steps involved in data reduction, such as evaluating the detected radiation energy spectrum by analyzing the electronic count pulse heights to determine R, and determining absolute or relative permeability values. The computer 48 may comprise a general purpose digital computer of the type PDP-11 which is manufactured by the Digital Equipment Corporation of Massachusetts. It will be appreciated by those skilled in the art that such a general purpose digital computer may be programmed, for example, in a commonly used programming compiler language, such as FORTRAN or the like, to perform the calculations necessary to derive the linear fluid flow velocity, the volume fluid flow rate, the quantity R, and, ultimately, the permeability values for the formations.

Figure 6:
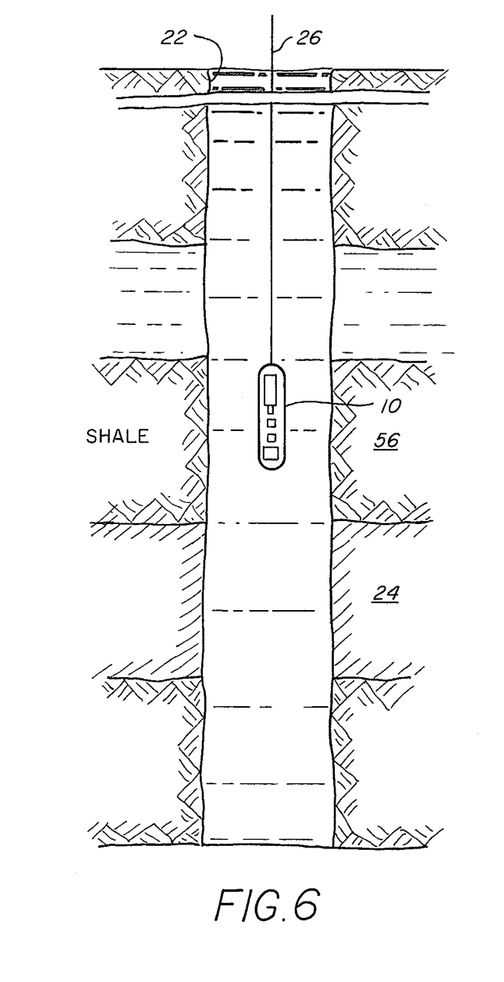
FIG. 6 is a schematic representation, in partial section, showing a sonde of the present invention in a borehole at the level of a shale formation.
Figure 7:
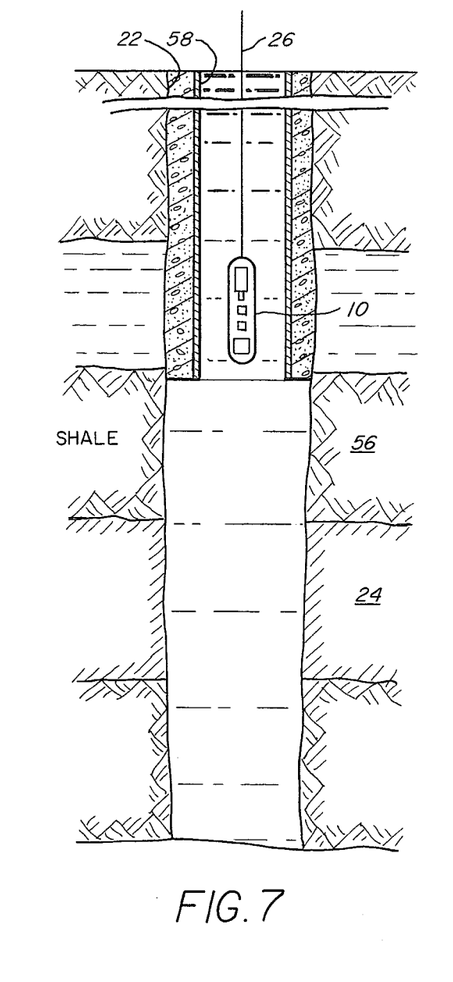
FIG. 7 is a view similar to FIG. 6, showing the sonde in a partially cased well bore.
Figure 8:
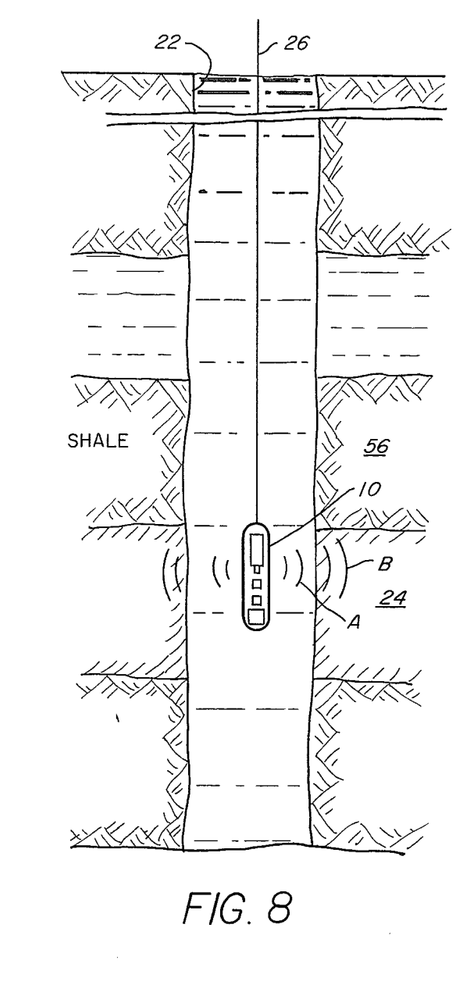
FIG. 8 is an illustration similar to FIGS. 7 and 8, with the sonde in position to test the permeability of a formation.

The method of the present invention may be more readily appreciated by reference to FIGS. 6–8, wherein the sonde 10 is shown at various levels within a borehole 22. In FIG. 6, the sonde 10 is at the level of a shale formation 56. Such a formation is known to be virtually impermeable. In FIG. 7, the sonde 10 is shown surrounded by casing 58 cemented in the borehole 22 as well lining. Such casing 58 also exhibits zero permeability. To calibrate the logging system, and, if desired, to obtain "zero count" readings corresponding to a standard, or impermeable environment, the sonde 10 may be placed in the condition shown in FIG. 6 or 7. Then, the neutron generator 30 may be operated to produce a burst or neutrons from the source 12, the transducer 20 operated to generate acoustic distrubances moving through borehole fluid, and the detector system activated to obtain count rates from the decaying $N^{16}$ particles in the situation where there is virtually no fluid flow across the borehole-formation interface due to acoustic pumping. Such "zero count" readings may be used in calculating absolute, or relative, permeability values for formations at other levels.

In FIG. 8 the sonde 10 is positioned at the level of the formation 24 whose permeability is to be determined. The neutron generator 30, the transducers 20, and the detector system may be then operated as described hereinbefore, either in a pulsed or a continuous mode, or some combination thereof. Then, with a distribution of unstable $N^{16}$ particles generally surrounding the sonde 10, acoustic disturbances, indicated by A, propagate through the fluid in the borehole 22 toward the interface between the borehole and the formation 24. Refracted wave energy appears within the formation as disturbances, indicated by B. The acoustic pumping that occurs at the interface, as described hereinbefore, results in generally vertical fluid flow along the borehole 22, which is measured by the detectors 14 and 16 acquiring count values from the array of decaying $N^{16}$ particles, as this array is changed by the fluid flow along the borehole 22. Thus, the count rate values, which reflect the borehole fluid flow, are fed to the surface data reduction circuitry illustrated in FIG. 5, and pertinent values related to the permeability of formation 24 are determined.

As noted hereinbefore, a measure of the permeability of the formation 24 may be obtained based upon the detected linear velocity value for the fluid flow along the borehole 22, or the linear velocity value may be combined with a value for the lateral distance between the center of the sonde 10 and the geometric center of the vertical fluid flow, obtained by spectral degradation measurements, to arrive at a measure of the volume fluid flow rate along the borehole. In the latter case, the volume flow rate may be used to obtain a measure of the permeability of the formation 24. In either case, the "zero count" obtainable by the method described in relation to either FIG. 6 or FIG. 7 may be used in evaluating the permeability of the formation 24.

Radiation count data may also be obtained directly from the array of unstable $N^{16}$ particles within the formation 24. In this case, the sonde 10 is positioned at the level of the formation to be evaluated, and the neutron generator 30 is operated to irradiate the area with neutrons. Then, with the neutron generator inactive, the detection system is activated to measure the radiation counts $C_A$ coming from $N^{16}$ particles decaying within the formation 24 and the borehole 22. The neutron generator 30 is activated to again irradiate the area while the transducers 20 are simultaneously operated to acoustically pump activated borehole fluid across the borehole boundary thereby increasing the residue of $N^{16}$ particles decaying in the formation by an amount which is a function of the permeability of the formation. Then with the neutron generator 30 and the transducers 20 all inactive, the detector is again activated to measure the radiation counts $C_B$ coming from decaying $N^{16}$ particles. The difference in the counts $C_A$ and $C_B$ is a function of the amount of fluid pumped across the borehole boundary which is, in turn, a function of the formation permeability. In this way, the amount of acoustic pumping within the formation 24 is directly measured by way of the detectors 14 and 16, rather than the vertical fluid flow along the borehole 22 being measured as a function of the acoustic pumping effect at the formation 24. Also, in this case, since velocity or flow rate values are not needed to reduce the count data to a measure of the formation 24 permeability, only one detector, say, 14, need be used to acquire the necessary count data.

The method and apparatus of the present invention may be employed in a continuous well logging operation. In this event, the sonde 10 may be lowered to the bottom of the borehole 22, and slowly raised, with the steps of irradiating, acoustic pumping, and detecting being carried out repeatedly to acquire a complete logging of all formations throughout the length of the borehole as desired. As noted hereinbefore, the construction of the sonde 10 may be varied to place transducers 20 and the detectors 14 and 16 above the neutron source 12. Then, as the sonde 10 is raised along the borehole 22, the detectors will preceed the source thereby minimizing the background $N^{16}$ radiation caused by activated borehole fluid flowing past the detectors due to the upward movement of the sonde.

It will be appreciated that a vertical fluid flow may be present in the borehole 22 independently of acoustic pumping and sonde movement. Such fluid flow might result in additional background radiation for a given source-detection configuration. Then, such fluid flow may be measured by the irradiation and detection steps described herein, followed by appropriate data reduction. The naturally occurring fluid flow thus measured constitutes a background for the fluid flow measurements related to the acoustic pumping at the formation to be evaluated. Consequently, in reducing count data to obtain a measure of fluid flow due to acoustic pumping, the two types of fluid flow measurements are compared, and the acoustic pumping induced fluid flow component isolated for determining formation permeability information. If the sonde is oriented such that the neutron source is above the detectors, the relative fluid flow by the sonde 10 as the sonde is raised to measure formation permeability throughout the well may be similarly treated.

The foregoing disclosure and description of the invention is illustrative and explanatory thereof, and various changes in the method steps as well as in the construction of the illustrated apparatus may be made within the scope of the appended claims without departing from the spirit of the invention.

We claim:

1. Apparatus for evaluating underground formations adjacent a borehole therethrough comprising:
   a. down hole tool means;
   b. neutron source means, as part of said tool means, for providing neutrons of at least 10 MEV energy for interaction with target particles in the vicinity of said tool means;
   c. radiation detection means, as part of said tool means, for detecting radiation from unstable resultant particles produced as a result of said interaction; and
   d. acoustic transducer means, selectively operable for generating individual acoustic pulses or acoustic wave trains, as part of said tool means, for selectively generating acoustic disturbances in under ground fluid in the vicinity of said tool means.

2. Apparatus as defined in claim 1 wherein said transducer means comprises a plurality of magnetostriction transducers, arranged for producing pulses or wave trains generally laterally relative to the borehole orientation.

3. Apparatus as defined in claim 2 wherein said neutron source means comprises neutron accelerator means including target means.

4. Apparatus as defined in claim 3 wherein said radiation detection means comprises gamma ray detection means.

5. Apparatus as defined in claim 3 wherein said radiation detection means comprises a first sensor device and a second sensor device, longitudinally spaced at first and second distances, respectively, from said target means of said neutron accelerator means.

6. Apparatus as defined in claim 3 further comprising shielding means, as part of said tool means, positioned between said target means of said neutron accelerator means and said radiation detection means.

7. Apparatus as defined in claim 3 further comprising positioning means, as part of said tool means, for positioning said tool means laterally within said borehole.

8. Apparatus as defined in claim 1 further comprising positioning means, as part of said tool means, for positioning said tool means laterally within said borehole.

9. Apparatus as defined in claim 1 wherein said neutron source means comprises neutron accelerator means including target means.

10. Apparatus as defined in claim 9 wherein said radiation detection means comprises a first sensor device and a second sensor device, longitudinally spaced at first and second distances, respectively, from said target means of said neutron accelerator means.

11. Apparatus as defined in claim 9 wherein said acoustic disturbance production means comprises a plurality of magnetostriction transducers, arranged for producing pulses or wave trains generally laterally relative to the borehole orientation.

12. Apparatus as defined in claim 1 further comprising shielding means, as part of said tool means, positioned between said target means of said neutron accelerator means and said radiation detection means.

13. A method of evaluating the permeability of an underground formation adjacent a borehole therethrough comprising the steps of irradiating underground material, including particles of fluid in the vicinity of said formation, with neutrons of 10 MEV or more energy, generating one or more acoustic pulses in said fluid in said borehole in the vicinity of said formation, determining the net flow of fluid across the boundary between said borehole and said formation due to the interaction of said pulses with said boundary, by measuring the net flow of said fluid in said borehole through the mechanism of detecting the radiation emitted by particles produced as a result of said neutron irradiation and which are part of said fluid flowing in said borehole, and determining a measure of said permeability of said formation based on said net fluid flow across and boundary.

14. A method as defined in claim 13 wherein the step of irradiating said underground material is carried out by selectively pulsing a neutron generator to produce bursts of neutrons.

15. A method as defined in claim 14 wherein the step of generating one or more acoustic pulses is carried out by selectively operating one or more magnetostriction transducers in acoustic communication with said fluid in said borehole.

16. A method as defined in claim 15 wherein the step of measuring said net fluid flow in said borehole by detection of radiation is carried out by operating two gamma ray sensors, each positioned at different know distances, generally along the borehole, from the point of origin of said neutron bursts in the neutron generator.

17. A method as defined in claim 16 further comprising carrying out the aforementioned steps of irradiating underground material, generating one or more acoustic pulses, and determining net fluid flow across the borehole boundary in the vicinity of two different underground formations, and determining a measure of the permeability of one such formation relative to the other formation by comparing the net fluid flow across the borehole boundary at one such formation with the net fluid flow across the borehole boundary at the other formation.

18. A method as defined in claim 16 wherein the step of measuring said net flow of said fluid in said borehole is further carried out by obtaining a measure of the linear velocity of said fluid flow in said borehole.

19. A method as defined in claim 16 wherein the step of measuring said net flow of said fluid in said borehole is further carried out by obtaining a measure of the volume flow rate of said fluid in said borehole.

20. A method as defined in claim 16 further comprising carrying out the above-mentioned steps of irradiating underground material, generating one or more acoustic pulses, and determining net fluid flow across the borehole boundary in a periodic sequence of steps as follows:

a. irradiating material with a burst of neutrons from said neutron generator in a pulse of time T1 long;

b. operating said one or more magnetostriction transducers for a time T2 long, where said time T2 begins a time t1 after said time T1 ceases;

c. determining net fluid flow by operating said sensors and detecting said radiation during a time T3 long, where said time T3 begins a time t2 after said time T2 begins; and d. repeating steps a) through c) herein, with subsequent times T1 beginning after both times T2 and T3 have ceased during each such repetition.

21. A method as defined in claim 20 wherein said magnetostriction transducers are operated during each period of said sequence of steps for a time T2 to produce a wave train essentially T2 long.

22. A method as defined in claim 20 wherein said magnetostriction transducers are operated during each period of said sequence of steps for a time T2 to produce a single compressional pulse essentially T2 long.

23. A method as defined in claim 20 further comprising carrying out the aforementioned steps of irradiating underground material, generating one or more acoustic pulses, and determining net fluid flow across the borehole boundary in the vicinity of two different underground formations, and determining a measure of the permeability of one such formation relative to the other formation by comparing the net fluid flow across the borehole boundary at one such formation with the net fluid flow across the borehole boundary at the other formation.

24. A method as defined in claim 13 further comprising carrying out the aforementioned steps of irradiating underground material, generating one or more acoustic pulses, and determining net fluid flow across the borehole boundary in the vicinity of two different underground formations, and determining a measure of the permeability of one such formation relative to the other formation by comparing the net fluid flow across the borehole boundary at one such formation with the net fluid flow across the borehole boundary at the other formation.

25. A method as defined in claim 13 wherein the step of measuring said net flow of said fluid in said borehole is further carried out by obtaining a measure of the linear velocity of said fluid flow in said borehole.

26. A method as defined in claim 13 wherein the step of measuring said net flow of said fluid in said borehole is further carried out by obtaining a measure of the volume flow rate of said fluid in said borehole.

27. A method of evaluating the permeability of an underground formation adjacent a borehole therethrough comprising the steps of:
   a. providing neutron generator means capable of selectively producing bursts of essentially 14 MEV neturons, acoustic disturbance generator means capable of selectively producing acoustic wave trains or individual acoustic pulses, and radiation detection means capable of selectively detecting gamma radiation, where all said means are locatable in a single down hole tool;
   b. positioning the means defined in a) herein in said borehole in the vicinity of said formation;
   c. operating said neutron generator means in a cyclic mode to periodically produce bursts of neutrons, expelled into the underground area surrounding said neutron generator means in the vicinity of said formation, wherein the period o said cyclic mode is T1, and the duration of each burst pulse, during which neutrons are produced and expelled, is $T2 < T1$;
   d. operating said acoustic disturbance generator means in a cyclic mode to produce acoustic disturbances of duration T3, wherein said acoustic disturbances are communicated to underground fluid surrounding said acoustic disturbance generator means, and $T3 < T1$;
   e. operating said radiation detection means to measure radiation emitted from unstable particles produced in said underground fluid as a result of said neutron bursts; and
   f. reducing data required by said radiation measuring to determine net fluid flow in said borehole as a result of said acoustic disturbances communicated to underground fluid to obtain a measure of the permeability of said formation.

28. A method as defined in claim 27 further comprising performing the steps of producing cyclic neutron bursts, producing acoustic disturbances, and measuring radiation, as described hereinbefore in claim 27, in the vicinity of a second formation, and further comprising the steps of reducing data acquired by said radiation measuring in the vicinity of said second formation, and comparing such reduced data from said second formation to obtain a measure of the permeability of one of said formations relative to that of the other of said formations.

29. A method as defined in claim 28 wherein the acoustic puses produced by operation of said acoustic disturbance generator means are each compressional pulses of period T3, such that one such pulse is produced each period T2 of neutron burst production.

30. A method as defined in claim 28 wherein the acoustic pulses produced by operation of said acoustic disturbance generator means comprise wave trains T3 long, such that one such wave train is produced each period T1 of neutron burst production.

31. A method as defined in claim 28 wherein the steps of reducing data to determine net fluid flow in said borehole further comprises obtaining values of the linear velocities of said fluid flow in said borehole.

32. A method as defined in claim 28 wherein the steps of reducing data to determine net fluid flow in said borehole further comprise obtaining values of the volume flow rates of said fluid in said borehole.

33. A method as defined in claim 27 wherein the step of reducing data to determine net fluid flow in said borehole further comprises obtaining values of the linear velocity of said fluid flow in said borehole.

34. A method as defined in claim 27 wherein the step of reducing data to determine net fluid flow in said borehole further comprises obtaining values of the volume flow rate of said fluid in said borehole.

35. A method of evaluating the permeability of an underground formation adjacent a borehole therethrough comprising the steps of irradiating the underground fluid at the location of the borehole in said formation with neutrons of sufficient energy to interact with oxygen particles in said fluid according to the reaction of $O^{16}(n,p)N^{16}$, thereby producing unstable nitrogen 16 isotope particles, producing acoustic disturbances at the interface between said borehole and said formation, detecting radiation emitted by said nitrogen 16 particles to obtain a measure of net fluid flow across said interface, and reducing said measure of net fluid flow to obtain a measure of the permeability of said formation.

* * * * *

UNITED STATES PATENT AND TRADEMARK OFFICE
CERTIFICATE OF CORRECTION

PATENT NO. : 4,102,185

DATED : July 25, 1978

INVENTOR(S) : Donald J. Dowling and Dan M. Arnold

It is certified that error appears in the above-identified patent and that said Letters Patent are hereby corrected as shown below:

Col. 15, line 26, "o" should read --of--.

Col. 16, line 9, "puses" should read --pulses--.

Col. 16, line 12, "T2" should read --T1--.

Signed and Sealed this

Twenty-first Day of April 1981

[SEAL]

Attest:

RENE D. TEGTMEYER

Attesting Officer    Acting Commissioner of Patents and Trademarks